(No Model.)
W. SCULLY.
Stovepipe Damper.
No. 231,241. Patented Aug. 17, 1880.
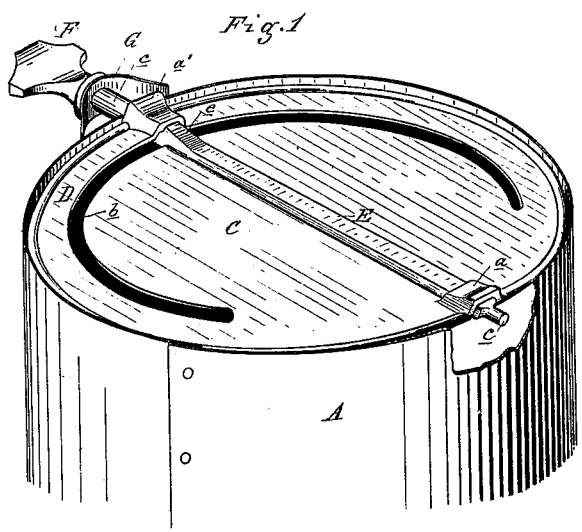
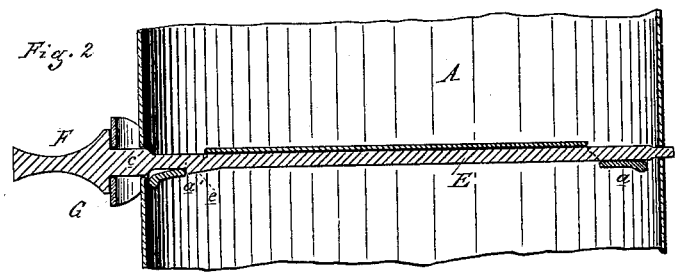
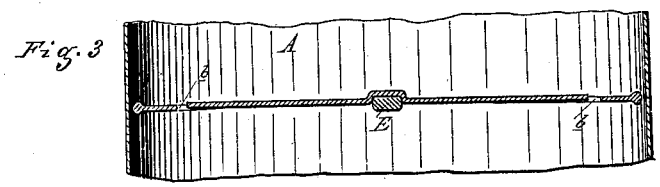
Attest:
A. Barthel
C. A. Lane
Inventor:
Wm Scully
By Atty
Thos. S. Sprague

UNITED STATES PATENT OFFICE.

WILLIAM SCULLY, OF DETROIT, MICHIGAN.

STOVE-PIPE DAMPER.

SPECIFICATION forming part of Letters Patent No. 231,241, dated August 17, 1880.

Application filed May 27, 1880. (No model.)

*To all whom it may concern:*

Be it known that I, WILLIAM SCULLY, of Detroit, Wayne county, Michigan, have invented an Improvement in Dampers for Stove-Pipes, of which the following is a specification.

The nature of this invention relates to certain new and useful improvements in the construction of dampers for stove-pipes, and the object of the invention is to provide a damper the shaft of which is automatically secured to place by the spring of the damper-plate.

The invention consists in the peculiar construction of the damper-plate, and in the construction and arrangement of the various parts, all as more fully hereinafter set forth.

In the drawings, Figure 1 is a perspective view, showing my improved damper as applied to a stove-pipe the wall of which is partially broken away. Fig. 2 is a vertical central section through the damper and its shaft, the position of the damper being the reverse of Fig. 1. Fig. 3 is a vertical central section taken at right angles to that in Fig. 2.

In the accompanying drawings, which form a part of this specification, A represents a section of a stove-pipe within which it is desired to secure a damper, and in the walls of which have been properly punched the holes to receive and form bearings for the damper-shaft.
C represents the damper-plate, preferably of cast metal, and in which is formed the central depression to receive the shaft, and it is also provided with the sockets $a$ $a'$ at each side. A slot, $b$, is also formed in the damper-plate, extending partially around the same, which forms a tongue, D, in the plate, for the purposes hereinafter set forth.

E is the damper-shaft, round, as at $c$, to form the journals or bearings which rest in the perforations in the walls of the pipe. When the damper is in place the body of the shaft is rectangular in cross-section, so as to rest within the central depression in the plate. A shoulder, $e$, is cast on one face of the shaft at the end nearer the handle F, the incline of such shoulder extending toward the opposite end.

When the damper is placed within the stove-pipe the shaft is inserted through the hole near the slotted side of the damper-plate, and is pushed along in the depression therein until the end of the shaft enters the hole upon the opposite side of the pipe. In doing this the shoulder depresses the tongue D until said shoulder has passed beyond the inner edge of the socket $a'$, when the spring of the tongue compels the shoulder to engage with such socket, and the damper-plate is securely locked upon the shaft and beyond any possibility of its turning thereon.

In order to insure that the damper will remain in its adjusted position, I place a spring-plate, G, around the shaft. The ends of said spring, bearing against the outer wall of the pipe and exerting an outward pressure upon the handle, consequently draw the damper-plate into contact with the inner wall of the pipe and cause a sufficient friction to compel the damper to remain in the position to which it may be adjusted.

I am aware that it is not new to cut straight slits in a sheet-metal damper-plate and then bend the metal slightly in opposite directions, so that the damper-shaft may be forced through it, in which position it may be held by the flexibility of the metal, and I therefore make no claim, broadly, to holding the damper-plate on the shaft by the flexibility of the metal. There is, however, no tongue in the style of damper-plate referred to, as the slits are only short straight ones, and the damper-plate is not so cut as to leave a large portion of the metal in the form of a tongue detached from the rest, except on one side.

What I claim as my invention is—

1. A damper-plate wherein is formed a curvilinear slot for the purpose of producing a slightly flexible tongue in said plate, the spring of which is utilized as the means for securing said damper-plate upon its shaft, substantially as specified.

2. A damper in the plate of which is formed a tongue, D, and sockets $a$ $a'$, in combination with a shaft, E, upon which is formed a shoulder, $e$, substantially as and for the purposes set forth.

3. A damper in the plate of which is formed a tongue, D, and sockets $a$ $a'$, in combination with the spring-plate G and a shaft, E, upon which is formed a shoulder, $e$, substantially as and for the purposes described.

WILLIAM SCULLY.

Witnesses:
 H. S. SPRAGUE,
 D. M. THOMAS.